United States Patent
Kanigicherla et al.

(10) Patent No.: US 9,430,432 B2
(45) Date of Patent: Aug. 30, 2016

(54) OPTIMIZED MULTI-ROOT INPUT OUTPUT VIRTUALIZATION AWARE SWITCH

(75) Inventors: Balaji Kanigicherla, Andhra Pradesh (IN); Dhanumjai Pasumarthy, Andhra Pradesh (IN); Shabbir Haider, Andhra Pradesh (IN); Naga Murali Medeme, Andhra Pradesh (IN); Paulraj Kanakaraj, Andhra Pradesh (IN); Tapan Vaidya, Andhra Pradesh (IN)

(73) Assignee: Ineda Systems PVT. LTD. (IN)

( * ) Notice: Subject to any disclaimer, the term of this patent is extended or adjusted under 35 U.S.C. 154(b) by 446 days.

(21) Appl. No.: 14/112,386

(22) PCT Filed: Apr. 20, 2012

(86) PCT No.: PCT/IN2012/000292
§ 371 (c)(1),
(2), (4) Date: Oct. 17, 2013

(87) PCT Pub. No.: WO2012/143953
PCT Pub. Date: Oct. 26, 2012

(65) Prior Publication Data
US 2014/0040527 A1 Feb. 6, 2014

(30) Foreign Application Priority Data

Apr. 21, 2011 (IN) .......................... 1386/CHE/2011

(51) Int. Cl.
*G06F 3/00* (2006.01)
*G06F 5/00* (2006.01)
*G06F 13/40* (2006.01)

(52) U.S. Cl.
CPC ....... *G06F 13/40* (2013.01); *G06F 2213/0026* (2013.01); *G06F 2213/0058* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 7,184,399 | B2 * | 2/2007 | Lee | ..................... G06F 13/4282 370/230 |
| 7,979,592 | B1 * | 7/2011 | Pettey | .................. G06F 13/404 709/205 |

(Continued)

FOREIGN PATENT DOCUMENTS

WO 2006063297 6/2006

OTHER PUBLICATIONS

K Yogendhar et al. Realizing the Performance Potential of a PCI-Express IP. Design & Reuse [on-line] week of May 24, 2007 [retrieved on Oct. 10, 2012]. Retrieved from the Internet:<URL:http://www.design-reuse.com/articles/15900/realizing-the-performance-potential-of-a-pci-express-ip.html>.

(Continued)

*Primary Examiner* — Henry Tsai
*Assistant Examiner* — Christopher Bartels
(74) *Attorney, Agent, or Firm* — Workman Nydegger (57) ABSTRACT

In one implementation, an optimized multi-root input-output virtualization (MRIOV) aware switch configured to route data between multiple root complexes and I/O devices is described. The MRIOV aware switch may include two or more upstream ports and one or more downstream ports. Each of an upstream port and a downstream port may include a media access controller (MAC) configured to negotiate link width and link speed for exchange of data packets between the multiple root complexes and the I/O devices. Each of an upstream port and a downstream port may further include a clocking module configured to dynamically configure a clock rate of processing data packets based one or more negotiated link width and negotiated link speed, and a data link layer (DLL) coupled to the MAC configured to operate at the clock rate, wherein the clock rate is indicative of processing speed.

22 Claims, 5 Drawing Sheets

(56) References Cited

U.S. PATENT DOCUMENTS

| | | | | |
|---|---|---|---|---|
| 8,566,473 B2* | 10/2013 | Ajanovic | ............... | G06F 13/124 370/229 |
| 2002/0172195 A1* | 11/2002 | Pekkala | ................ | H04L 49/103 370/360 |
| 2004/0010612 A1* | 1/2004 | Pandya | .................... | H04L 29/06 709/230 |
| 2007/0047579 A1 | 3/2007 | Mukhopadhyay et al. | | |
| 2007/0097948 A1 | 5/2007 | Boyd et al. | | |
| 2009/0235008 A1* | 9/2009 | Deshpande | ........... | G06F 13/385 710/310 |
| 2009/0248947 A1* | 10/2009 | Malwankar | ........... | G06F 13/404 710/316 |
| 2010/0115174 A1* | 5/2010 | Akyol | ................... | G06F 13/385 710/316 |
| 2010/0146170 A1* | 6/2010 | Brown | ................ | G06F 13/4022 710/105 |
| 2011/0261687 A1* | 10/2011 | Armstrong | .......... | H04L 12/4625 370/230 |

OTHER PUBLICATIONS

International Search Report, PCT/IN2012/000292, China International Search Authority, Completed Oct. 10, 2012, Mailed Nov. 8, 2012.

Written Opinion of the International Search Report, PCT/IN2012/000292, China International Search Authority, Completed Oct. 15, 2012, Mailed Nov. 8, 2012.

\* cited by examiner

OPTIMIZED MULTI-ROOT INPUT OUTPUT VIRTUALIZATION AWARE SWITCH

CROSS-REFERENCE TO RELATED APPLICATIONS

This application claims priority to and the benefit of PCT Application Serial No. PCT/IN2012/000292, filed on Apr. 20, 2012, entitled "OPTIMIZED MULTI-ROOT INPUT OUTPUT VIRTUALIZATION AWARE SWITCH", which also claims priority to and the benefit of Indian Patent Application No. 1386/CHE/2011, entitled "OPTIMIZED MULTI-ROOT INPUT OUTPUT VIRTUALIZATION AWARE SWITCH", filed on Apr. 21, 2011, which are incorporated herein in their entirety.

TECHNICAL FIELD

The present subject matter relates, in general, to a Peripheral Component Interconnect Express (PCIe) switch and in particular, to a PCIe switch aware of multiple host processors.

BACKGROUND

Computing systems, for example desktop computers, hand held devices, etc., utilize buses and input-output (I/O) devices, both of which operate on an industry standard system level bus interconnect protocol called Peripheral Component Interconnect (PCI) standard. The PCI standard specifies a bus for attaching I/O devices to a computing system. Additionally, the PCI standard allows an I/O device to communicate with the computing system using predefined commands and exchange information such as interrupts, errors and other messages. However, to meet the demands of higher performance, and increased scalability and flexibility, a standard utilizing point to point transmission, having a higher speed and, which is scalable for future improvements, known as PCI Express (PCIe) protocol was developed by the Peripheral Component Interconnect Special Interest Group (PCI-SIG).

The PCIe protocol supports I/O virtualization. I/O virtualization relates to capability of the I/O devices to be used by more than one system image, i.e., by more than one operating system executing on a single host processor. For this, a single root input-output virtualization (SRIOV) standard has been developed by the PCI-SIG. The SRIOV standard is used to route information between the single host processor having multiple system images and virtualized I/O devices. The capabilities of the SRIOV aware switch have been extended by a multi root input-output virtualization (MRIOV) aware switch to allow sharing of the I/O devices between multiple host processors based on the standards of MRIOV provided by the PCI-SIG.

The PCI-SIG further defines MRIOV specifications which are extensions to the PCIe specifications to be implemented by an MRIOV switch to enable I/O device sharing between multiple non-coherent Root Complexes (RC). In a Multi Root PCIe environment, multiple RCs maintain their own PCIe domain which consists of one or more MRIOV aware switches and attached I/O devices, called a virtual hierarchy (VH). An MRIOV aware PCIe switch supports one or more upstream ports and associated VHs. With multiple RCs and several I/O devices, an MRIOV aware switch has to implement multiple VHs and functionalities. Further, with such technology enabling multiple functionalities on a single hardware platform, and hardware platforms becoming more and more portable, the power consumption and the silicon area utilized by increased components like MRIOV aware switch on the hardware platform increases.

SUMMARY

This summary is provided to introduce concepts related to implementation of an optimized multi-root input output virtualization aware switch, which are further described in the detailed description. This summary is not intended to identify essential features of the present subject matter nor is it intended for use in determining or limiting the scope of the present subject matter.

In one implementation, an optimized multi-root input-output virtualization (MRIOV) aware switch configured to route data between multiple root complexes and I/O devices is described. The MRIOV aware switch may include two or more upstream ports and one or more downstream ports. Each of an upstream port and a downstream port may include a media access controller (MAC) configured to negotiate link width and link speed for exchange of data packets between the multiple root complexes and the I/O devices. Each of the upstream port and the downstream port may further include a clocking module configured to dynamically configure a clock rate of processing data packets based one or more of a negotiated link width and negotiated link speed, and a data link layer (DLL) coupled to the MAC configured to operate at the clock rate, wherein the clock rate is indicative of processing speed. The optimized MRIOV aware switch may also include a MRIOV core switching module coupled to the two or more upstream ports and the one or more downstream ports, configured to perform arbitration for the data packets in a multi-host computing system.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Multi-host computing system implementing an optimized Multi-Root Input Output Virtualization (MRIOV) aware switch and techniques for data transfer to optimize power and silicon area of computing systems is described. The optimized MRIOV aware switch and techniques described can be implemented in a variety of computing systems. The multi-host computing systems may implement the described optimized MRIOV aware switch for the purpose of optimum power consumption and utilization of reduced silicon area. The multi-host computing systems may include but are not limited to, desktop computers, hand-held devices, laptops or other portable computers, mobile phones, personal digital assistants (PDA's), tablet personal computers, netbooks, smartphones, workstations, and the like, which may utilize a MRIOV aware switch for data transfer and communication with different I/O devices.

A multi-root PCIe environment has multiple hosts and each of the hosts maintains its own PCIe domain which comprises of one or more switches and endpoints, called a virtual hierarchy (VH). A MRIOV aware switch is generally employed in such a multi-root PCIe environment of multi-host computing systems utilizing a plurality of Root Complexes (RC) to enable sharing of hardware resources such as I/O devices. MRIOV specification of PCI-SIG defines new Data Link Layer (DLL) packet types and Transaction Layer Packet (TLP) prefix header tag to enable the implementation of VHs. Therefore, a MRIOV aware switch supports multiple upstream ports and associated virtual hierarchies separating the different PCIe domains originating at each of the RC present in the multi-root PCIe environment. Each VH supported by the MRIOV aware switch internally has a virtual switch (VS) which connects to one of the physical upstream ports provided by the switch.

Further, in cases when the upstream ports of the switch are attached to non-multi-root hosts, based on the multi-root configuration existing in the switch, TLPs associated with each of the roots need to be converted to multi-root TLPs by adding a virtual hierarchy identifier. These TLPs are then routed to the respective ports that exist in the corresponding virtual hierarchy. Therefore, a typical MRIOV aware switch, implemented in accordance to the specifications and standards of Peripheral Component Interconnect Special Interest Group (PCI-SIG) would utilize added power.

Additionally, the implementation of such a switch requires chip area on hardware platform for implementation of functionalities specified by the PCI-SIG. With increasing development of portable hardware platforms, the components are more and more battery dependent and therefore need to be more energy efficient. Further, with increasing portability, the requirement of smaller and compact hardware platforms is increasing. Therefore, to consume less energy and to utilize minimum chip area, an efficient and compact MRIOV aware switch is required. According to an implementation of the present subject matter, system and techniques for implementation of power efficient and compact optimized MRIOV aware switch in a multi-host computing environment is described.

In one embodiment, the optimized MRIOV aware switch and techniques described may be implemented in a variety of different computing systems. The multi-host computing systems may include but are not limited to, desktop computers, hand-held devices, laptops or other portable computers, mobile phones, personal digital assistants (PDA's), tablet personal computers, netbooks, smartphones, workstations, and the like, which may utilize a MRIOV aware switch for data transfer and communication with different I/O devices.

The implementation as described in the present subject matter, on one hand, can be implemented in standard PCIe protocol format by an optimized MRIOV aware switch, but on other hand, can also be implemented in other on-chip interconnect protocols such as Virtual Component interface (VCI), Basic Virtual Component Interface (BVCI), Advanced Extensible Interface (AXI), Advanced High Performance Bus (AHB), Advanced Virtual Component Interface (AVCI), Open Core Protocol (OCP), and Peripheral Virtual Component Interface (PVCI). In order to implement the techniques of data transfer described in the present subject matter in a protocol other that PCIe, the multi-host computing systems may optionally implement a multi-protocol MRIOV aware switch.

The described optimized MRIOV aware switch allow(s) sharing of multiple hardware resources, such as I/O devices across multiple hosts running on a common hardware platform. With the capability of simultaneous device access, the optimized MRIOV aware switch is implemented to work more efficiently with a consumption of reduced dynamic power and improved overall switch routing performance.

In one implementation, the optimized MRIOV aware switch may include multiple upstream ports and multiple downstream ports to communicate with root complexes (RCs) and peripheral devices (I/O devices), respectively. The upstream ports and the downstream ports might be connected to a core switching unit, such as a MRIOV core switching module to transfer data packets from one upstream port to another downstream port, and vice versa. As would be understood by those skilled in the art, when the optimized MRIOV switch would receive a TLP, either on an upstream or downstream port, it is forwarded to the core switching unit through Media Access Controller (MAC) and DLL.

In one implementation, the optimized MRIOV aware switch may utilize different reduced clock rates for processing DLL packets received at different upstream, downstream and crosslink ports through the MAC. In said implementation, the clock rate of any upstream, downstream and crosslink port may be dynamically modified and reduced based on a negotiated link width, and speed of an interconnect. In other words, the clock rate of DLL processing may be modified depending on the configured link width of MAC and the adopted generation signalling.

Generally, the clock rate at which the MAC operates is 125 MHz for generation 1 signalling and, 250 MHz for generation 2 signalling. In one implementation, the clock rate for processing DLL packets on a port may be directly dependent on the link width configuration of the MAC of that port where, the processing of the DLL is varied based on the link width of the MAC. For lower configured link widths, the processing of DLL packets may be done at lower rates. For example, on a port with a negotiated configured link width of 1x, the DLL packet processing may be done at quarter the speed of the normal speed, i.e., for the MAC adopted for generation 1 signalling running at 125 MHz the DLL processing may be done at a speed of 31.25 (125/4) MHz. Similarly, for a negotiated configured link width of 2x, the DLL packet processing may be done at half the speed of the normal speed, i.e., for the MAC adopted for generation 2 signalling running at 250 MHz the DLL processing may be done at a speed of 125 (250/2) MHz. It would be appreciated by those skilled in the art that the DLL packet processing is varied for a 64 bit wide DLL data path.

Hence, it would be appreciated that different clock rates may be used for different link widths and different adopted generation signalling techniques. The said implementation may allow the processing of packets at a lower and reduced clock rate, which would consume less power and thereby would allow the optimized MRIOV aware switch to be energy efficient. Since the received packets are also switched by, a core switching unit, which is interfaced with multiple upstream and downstream ports running at different and modified clock rate, the core switching unit may process data packets at a constant clock rate.

In another implementation, the optimized MRIOV aware switch may implement input buffers and output buffers for each upstream, downstream and crosslink port. The input buffers may be configured to receive and store TLPs of different sizes at respective line rate from their respective ports. It would be appreciated by those skilled in the art that the line rate of any input buffer may define the processing speed of the buffer per unit of time. The input buffer may then forward the TLPs to other ports through the core switching unit.

In another implementation, the input buffers may also enable out-of-order read of TLPs at a rate equal to, or higher than the write rate. The read and write rates may be different since the DLL processing may occur at clock rates lower than the clock rates of the core switching unit, such as the MRIOV core switching module, and a packet received by the input buffer from DLL may be forwarded to components implementing different clock rates. Further the input buffer may implement an input buffer manager to manage the storing of the TLPs at different memory locations and allow out-of-order reads.

In one embodiment, the output buffer may be implemented to receive data packets received from other ports and to forward the data packets to its native port. As explained before, each upstream and downstream port may utilize an independent input buffer and an output buffer. The input buffer may be configured to receive data packets from the DLL and forward them to the MRIOV core switching module for transmission to other ports. Similarly, the downstream buffer may be configured to receive data packets from the MRIOV core switching module and provide to the DLL. For the sake of clarity, the input buffer and the output buffer of a particular port may be referred to as native buffers of the port hereinafter. In said embodiment, the output buffer may also store TLPs, but may not allow out-of-order reads and hence may implement a First-in-First-out (FIFO) scheme. The output buffer may also provide the replay functionality where the output buffer may maintain order of TLP sequence and may re-transmit TLP sequentially until the TLPs transmitted are accepted and indicated by the interfaced DLL.

Further, the optimized MRIOV aware switch may also process the header of a TLP. The header of a TLP may be processed for packet checking, and identification of destination port. Based on the identification of a destination port, the optimized MRIOV aware switch may forward the TLP to a router, which may finally send the packet to the destination port. In one implementation, the packets received by the input buffer may be arbitrated by an arbiter before being forwarded to the output buffer for delivery. It would be understood by a person skilled in the art that the arbitration technique implemented by the arbiter may be any technique known in the art such as, round robin, first in first out, last in first out, etc.

Additionally, the optimized MRIOV aware switch may also check for credit flow availability across different ports, buffer space availability and router resource availability before forwarding a TLP from an input buffer to destination. In one implementation, the optimized MRIOV aware switch may also implement power management of upstream, downstream and crosslink ports. For example, in situations when a downstream or an upstream port is idle for some predefined time interval, the optimized MRIOV aware switch may send the port to an idle mode. Similarly, an upstream or downstream port which is not connected to any I/O device, may be powered down depending on the operating mode of the MRIOV aware switch.

Further, the optimized MRIOV aware switch is capable of generating error messages. Depending on the scenario, the optimized MRIOV aware switch may internally generate messages to be sent to either the I/O devices, or the root complex. For example, a TLP failing in an internal Cyclic Redundancy Check (CRC), may need to be requested again from the sender. To request re-transmission, an error message should be sent to the sender. Therefore, in one implementation, the optimized MRIOV aware switch may generate and report such error messages to the sender. Although the generation of an internal message has been explained with reference to an error message, however, it would be understood by those skilled in the art the internal messages may be generated in other situations as well.

In one implementation, the optimized MRIOV aware switch is also capable of dynamically modifying the internal reduced clock rate of the core switching logic based on the active number of ports and link widths of such active links. In said implementation, the clock rate may be optimized to support; the bandwidth of all the ports. Further, the internal clock rate may be different than the reduced clock rate of DLL, modified and reduced based on link width and link speed negotiated by the ports.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the optimized MRIOV aware switch and techniques for data transfer are implemented in the multi-host computing system shall be explained in details with respect to the FIG. 1-5. While aspects of described systems for optimized MRIOV aware switch can be implemented in any number of different computing systems, environments, and/or configurations, the embodiments are described in the context of the following exemplary system(s).

Devices that can implement the disclosed system(s) include, but are not limited to, desktop computers, hand-held devices, laptops or other portable computers, mobile phones, personal digital assistants (PDA's), tablet personal computers, netbooks, smartphones, workstations, and the like which utilize a MRIOV aware switch for data transfer and communication with different I/O devices.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

Further, the functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Figure 1:
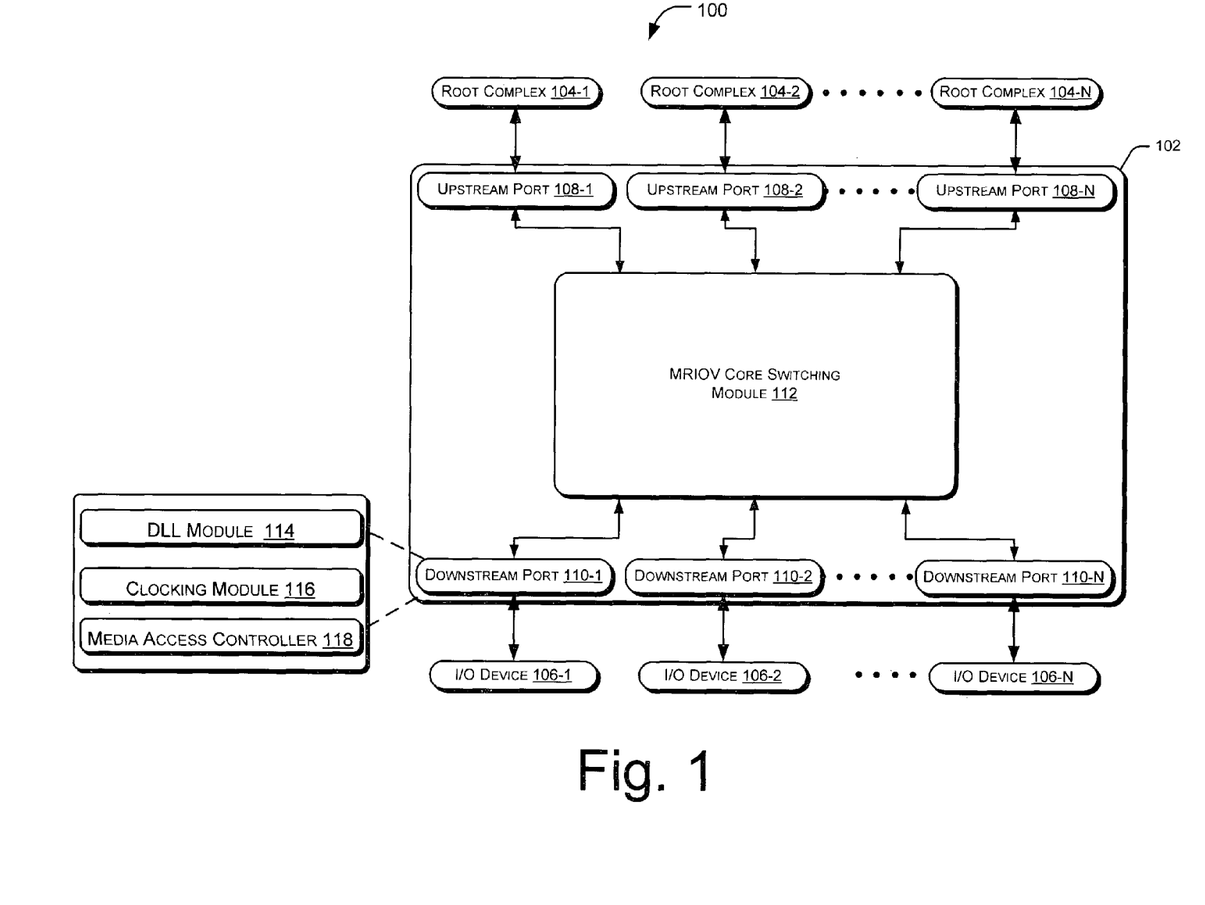
FIG. 1 illustrates an exemplary multi-host computing system implementing an optimized multi-root input output virtualization aware switch, in accordance with an embodiment of the present subject matter.

FIG. 1 illustrates a multi-host computing system 100 implementing an optimized MRIOV aware switch 102, according to an embodiment of the present subject matter. In one embodiment, the system 100 includes root complexes 104-1, 104-2, . . . , 104-N, collectively referred to as root complex(s) 104. The multi-host computing system 100 further includes I/O devices 106-1, 106-2, . . . , 106-N, collectively referred to as I/O device(s) 106.

The root complexes 104 may include microprocessors, microcomputers, microcontrollers, digital signal processors, central processing units, state machines, logic circuitries, and/or any devices that manipulate signals and data based on operational instructions. Among other capabilities, the root complexes 104 are individually configured to interact with the optimized MRIOV aware switch 102 through their respective upstream ports 108-1, 108-2, . . . , 108-N, collectively referred to as upstream port(s) 108 hereinafter.

The I/O device(s) 106 may include USB devices, storage devices, communication devices, human interface devices, audio devices, and the like. Additionally, the I/O device 106 may be a storage device, which boots one or more root complex 104. The I/O devices are individually configured to interact with the optimized MRIOV aware switch 102 through its respective downstream ports 110-1, 110-2, . . . , 110-N, collectively referred to as downstream port(s) 110. Among other capabilities, the downstream ports 110 are configured to receive data packets from respective I/O devices 106 to be provided to the root complexes 104. The data packets received by the downstream ports 110 are routed to destined root complex 104 through their respective upstream port 108, via a MRIOV core switching module 112.

In one implementation, the MRIOV core switching module 112 may implement multiple functionalities such as, data packet routing, data packet arbitration, power control and internal message generation. In said implementation, the MRIOV core switching module 112 may route data packets from one downstream port 110 to one other destined upstream port 108. Similarly, the MRIOV core switching module 112 may also route data packets from one upstream port 108 to another destined downstream port 110. Additionally, the MRIOV core switching module 112 may arbitrate between the data packets received from upstream ports 108 and downstream ports 110. For example, data packets originating at the same time from two different downstream ports 110-1 and 110-2, and destined to a single upstream port 108-1 are arbitrated by the MRIOV core switching module 112. Based on pre-defined arbitration logic, the MRIOV core switching module 112 may route the data packet originating from the downstream port 110-1 to the upstream port 108-1 before the data packet originating from the downstream port 110-2.

In one implementation, the downstream port 110-1 may include a DLL module 114 and a clocking module 116. The DLL module 114 may be configured to negotiate a multi-root link protocol with the I/O devices 106-1 based on the configuration settings. The DLL module 114 is capable of operating over a multi-root mode, and upon negotiating the link width with the I/O device 106-1, the. DLL module may initiate a multi root flow control for each of the VHs existing for each root complex 104. In said implementation, the DLL module 114 may also support the implementation of virtual hot reset DLL packets and multi-root flow control update DLL packets.

The DLL module 114 is further configured to ensure the data integrity of TLPs. For this purpose, the DLL module 114 may perform link Cyclic Redundancy Check (CRC) on the data packets. In one implementation, the DLL module 114 checks for data integrity of all the packets, either received from native port (downstream port 110-1) or from other ports (upstream ports 108). Yet in another implementation, the DLL module 114 may check for data integrity of TLPs either received only from the native port (downstream port 110-1) and need to be forwarded to other ports (upstream ports 108), or the TLPs received from other ports (upstream ports 108) and are to be forwarded to the native port (downstream port 110-1).

In another implementation, the DLL module 114 may also send ACKnowledged (ACK) and Not AcKnowledged (NAK) messages. The ACK/NAK protocol is utilized by the DLL module 114 for automatic retransmission of failed TLPs. Further, the automatic link retraining in the scenarios of persistent transmission failure is also implemented by the DLL module 114. Apart from the above mentioned functions, according to an implementation, the DLL module 114 is also configured to operate over a non multi-root mode. If upon negotiating the link with the I/O device 106-1, the DLL module 114 identifies the connected I/O device 106-1 to be non multi-root aware, a base PCIe base flow control may be initiated.

The downstream port 110-1 also includes a clocking module 116. The clocking module 116 is configured based on the negotiated link width and link speed between the DLL module 114 and the I/O device 106-1. In said implementation, the link width may include $X_1$, $X_2$, $X_4$, $X_8$, $X_{16}$, $X_{32}$ or any other link width possible. The link speed negotiated may depend on the type of generation signaling adopted by the downstream port 110-1 and I/O device 106-1. In one implementation, the downstream port 110-1 may negotiate a generation 1 signaling technique and operate at a clock rate of 125 MHz. However, in another implementation, the downstream port 110-1 may negotiate a generation 2 signaling technique and operate at a clock rate of 250 MHz.

In one implementation, based on the negotiated link width and link speed, the clocking module 116 may decide upon an operating clock rate for the DLL module 114. For example, if the negotiated link width and link speed with an I/O device 106-1 is $X_1$, and generation 1 at 125 MHz respectively, the clocking module 116 may implement a clock rate for the DLL module 114 that is quarter the link speed, i.e., 31.25 MHz. Similarly, if the negotiated link width is $X_2$ and link speed is generation 1, the clocking module 116 may implement a clock rate for the DLL module 114 that is half the link speed, i.e., 62.5 MHz. Further, if the negotiated link width is X1, and the link speed is generation 2 (250 MHz), the clock rate for DLL module 114 operation may be implemented at a quarter of generation 2 speed, i.e., 62.5 MHz. Therefore, the clocking module 116 may dynamically modify the clock rate of DLL module 114 based on the negotiated link width and link speed.

Further, since the DLL module 116 implemented in the downstream port 110-1 can be implemented at reduced clock rates, in one implementation, the end-to-end CRC check of data packets can also be performed by the DLL module 116. The implementation of end-to-end CRC checks by the DLL module 116 at reduced clock rates may reduce the dynamic power consumption of the optimized MRIOV switch 102.

Although the DLL module 114 and the clocking module 116 have been shown in the downstream port 110-1 however, in one implementation, each downstream port 110 and each upstream port 108 may include different DLL modules and clocking modules. Further, the functionality of DLL module 114 and clocking module 116 has been explained with reference to the downstream port 110-1, however, it would be understood by those skilled in the art that the DLL modules and the clocking modules included in other upstream and downstream ports would implement similar functionalities in a similar manner.

For example, clocking module included in the upstream port 108-1 may dynamically modify the clock rate of DLL module present in upstream port 108-1 based on the negotiated line width and line speed with the root complex 104-1. It will also be understood by those skilled in the art that the dynamically modified operating clock rate of DLL modules may be different for different DLL modules and is independent of each DLL module.

Additionally, the DLL modules may also support hot reset requests. A hot reset request may be communicated in the form of reset DLLP packets. As would be understood by those skilled in the art that a complete reset DLLP may be sent for communication with a multi-root negotiated link and a hot reset TS1/2 ordered set may be sent for communication with a non multi-root negotiated link.

The downstream ports 110-1 may also implement a media access controller 118 to determine link width and speed compatibility based on the negotiation between the downstream port 110-1 and the connected I/O device 106-1. The media access controller 118 may also negotiate link width, link data rate, lane reversal and polarity inversion.

Figure 2:
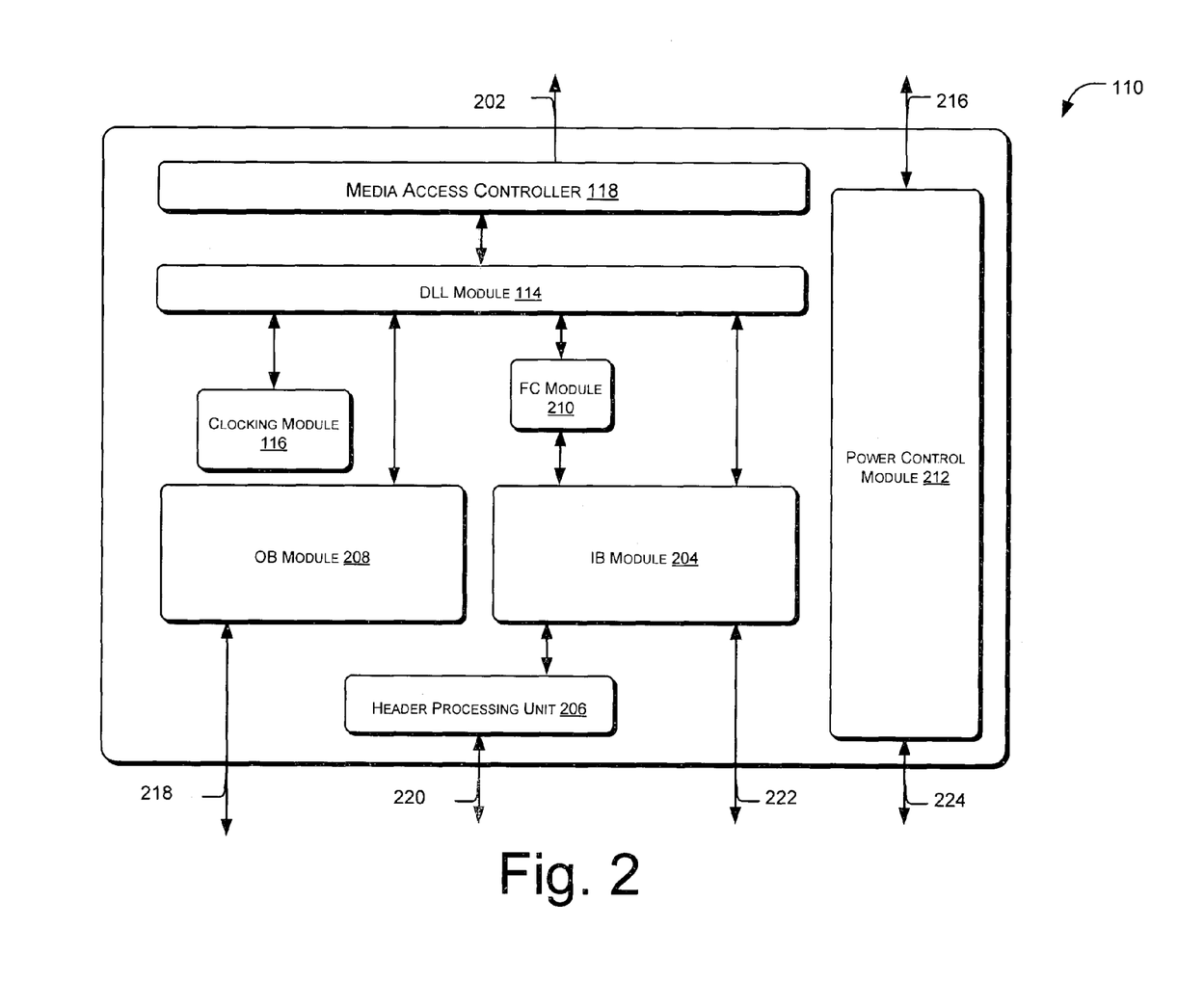
FIG. 2 illustrates an exemplary downstream port, in accordance with an embodiment of the present subject matter.

FIG. 2 illustrates a downstream port 110, in accordance with an embodiment of the present subject matter. In said embodiment, the downstream port 110 includes the DLL module 114, the clocking module 116, and the media access controller 118. In one implementation, the DLL module 114 may receive data packets from a connected I/O device 106 (not shown) via media access controller 118. The media access controller 118 may receive the data packets through an interface 202 connecting the media access controller 118 and the I/O device 106. In said implementation, the DLL module 114 may be configured to perform link CRC checks of the data packets received to ensure the data integrity of the packets. Further, the DLL module 114 may be configured to process DLL packets at reduced clock rates determined by the clocking module 116, as discussed in FIG. 1. The process of dynamically modifying the clock rate based on the negotiated link width and link speed has been explained in FIG. 1, and therefore, the details of the same have been omitted here for the sake of brevity.

In one implementation, the data packets received by the downstream ports 110 and routed to the DLL module 114 are forwarded to an Input Buffer (IB) module 204, referred to as IB module 204 hereinafter. The IB module 204 may be configured to store the received TLPs. The IB module 204 may locally store the TLPs in a memory (not shown) for the purpose of forwarding. The memory may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes.

The TLPs received and stored by the IB module 204 include a packet header data and a payload. The header data of a TLP may include information about the destination of the packet, the details about the virtual switch destination of the packet, and the TLP type. According to one embodiment, the IB module 204 may send the header data of the received TLP to a header processing unit 206. The header processing unit 206 is configured to process the header data of the TLP. It would be understood by those skilled in the art that the header data of the TLP received by the header processing unit 206 would be in encoded form.

The header processing unit 206 may decode the received TLP header data and may also ensure its data integrity. For this purpose, the header processing unit 206 may perform an end-to-end CRC of the TLP header data. In one implementation, upon identifying an erroneous data packet, the header processing unit 206 may generate a signal and send to the MRIOV core switching module 112 (as shown in FIG. 1). The MRIOV core switching module 112 may upon receiving such a signal generate an error message and send to the port from which the TLP was received.

The header data for the received TLP includes the destination details of the TLP and therefore, the header processing unit 206 extracts the destination details from the header data of the packet. The destination of the packet can either by an external port, or may be an internal location to provide or update information. For example, the destination of the TLP received from the downstream port 110-2 may be the root complex 104-1 (as shown in FIG. 1) via the upstream port 108-1. The header processing unit 206 may process the information to identify the destination. However, in another example, the destination of the TLP may be an internal memory location to write data to the configuration registers.

In implementation, the header processing unit 206 may decode the header data of the TLP to identify the destination virtual switch for the data packet. Based on the identified virtual switch, the header processing unit 206 may select a configuration space and may further decode the header data against the selected configuration space. According to the PCIe architecture, the each virtual switch from amongst different virtual switches may include multiple internal ports. Therefore, upon identification of a destination virtual switch for the TLP, the header processing unit 206 also identifies a destination internal port. To determine an internal destination port, the header processing unit 206 may decode the header data against each internal port configuration space present in the virtual switch. For efficient and fast processing, the header processing unit 206 decodes the header data of the TLP against every internal port of the virtual switch in parallel.

Additionally, the header processing unit 206 may perform certain functions such as packet type decoding, address fields extraction, memory and IO spaces check, detection of errors, and comparison of the received TLP's virtual hierarchy against virtual switch bridge tables' entries of the received port. The header processing unit 206 matches the virtual hierarchy number of the packet to determine the virtual switch to which the TLP belongs.

In one embodiment, the header processing unit 206 is further configured to determine a routing mechanism based on the TLP type. As explained earlier, the header data of a TLP contains details about the data packet type, which when processed allows the header processing unit 206 to identify the routing mechanism of the data packet. In said implementation, the routing mechanisms may include address based routing, ID based routing and implicit routing mechanism.

In one implementation, upon processing the header data of the TLP, the header processing unit 206 sends a Header Code (HC) to the MRIOV core switching module 112 (as shown in FIG. 1). The HC may be utilized by the MRIOV core switching module 112 for arbitration of different data packets and for routing the data packet to its destination port. The details of routing mechanism and arbitration are explained with reference to MRIOV core switching module in FIG. 5 and therefore, the explanation has been omitted here for the sake of brevity.

The downstream port 110 may further include an output Buffer (OB) module 208, referred to as OB module 208 hereinafter. In one implementation, the OB module 208 is configured to receive data packets to be sent to the native downstream port. For this purpose, the OB module 204 may include a buffer memory (not shown) which may store the data packets for the purpose of delivery to the DLL module 114. In said implementation, the OB module 208 may receive the data packets from the MRIOV core switching module 102 (as shown in FIG. 1).

Further, the downstream port 110 may include a flow control module 210, referred to as FC module 210 hereinafter. The flow control module 110 communicates between the IB module 204 and the DLL module 114. The flow control module 110 also enables the exchange of credit flow information between the transmitter and receiver. In one implementation, the flow control updates may be sent for the TLPs forwarded from the IB module 204. In operation, every TLP stored in the IB module 204 is transmitted to its destination. Once a TLP packet stored is completely sent, the space in the memory buffer of the IB module 204 becomes vacant. The complete transmission of a data packet from the IB module 204 may trigger the FC module 210 to initiate the flow control mechanism. The FC module 210 may instruct the DLL module 114 to transmit a PCIe Flow control (FC) update packet. It would be understood by those skilled in the art that since the DLL module 114 may be implemented at reduced clock rates, the DLL module 114 would also forward the FC update packets at reduced clock rates.

According to an implementation, the downstream module 110 may also include a power control module 212. The power control module 212 is configured to transition the native downstream port to LØs state if the port is identified to be idle for more than a pre-defined time interval. According to the standard of PCIe, a port can be identified to be idle when the upstream ports receiving lanes are in LØs state, there are no pending TLPs to be transmitted to any of the active virtual hierarchies, no flow credit information needs to be transmitted, and there are no pending DLL packets to be transmitted to any of the active virtual hierarchies.

Further, the power control module 212 may transition the native downstream port to L1 state when a 'PM_Enter_L1' DLL packet is received from the link partner. Also, the power control module 212 may transition the native downstream port to L2/L3 state when a 'PM_Enter_L23' DLL packet is received from the link partner.

It would be understood by those skilled in the art that although the components of downstream port 110 have been explained in reference to one downstream port however, each downstream port may include these components individually and may function independently from other downstream ports. Further, the components may also be included in each of the upstream port 108.

Figure 3:
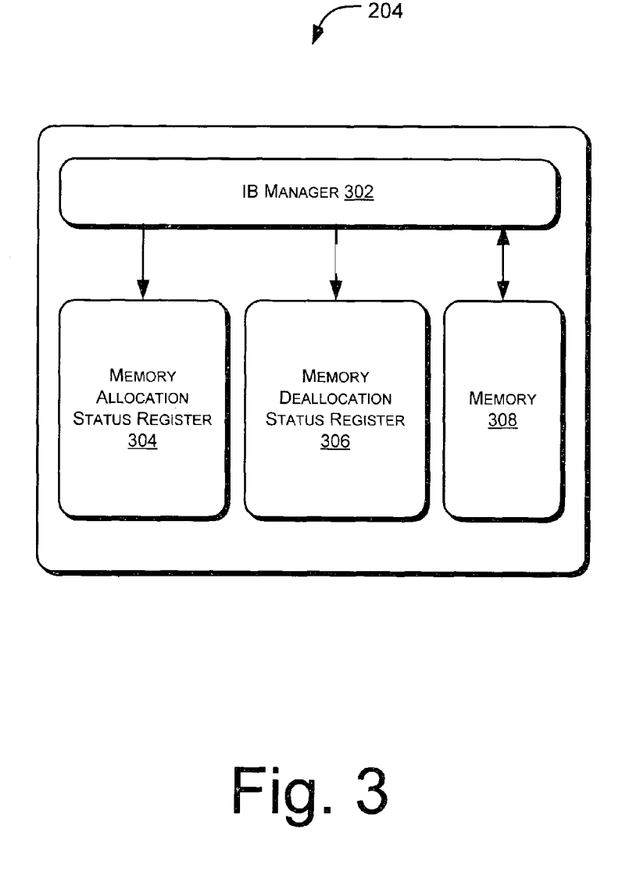
FIG. 3 illustrates an exemplary Input Buffer (IB) module, in accordance with an embodiment of the present subject matter.

FIG. 3 illustrates an exemplary IB module 204, in accordance with an embodiment of the present subject matter. In said embodiment, the IB module 204 includes an Input Buffer (IB) manager 302 connected to a memory allocation status register 304 and a memory de allocation register 306. The IB module 204 may further include a memory 308.

As explained earlier in FIG. 1, the IB module 204 is configured to store incoming TLPs coming from the native port. The received TLPs are stored in a local memory 308. In one implementation, the IB module 204 may store the TLPs in different storage banks. In one example, the size of each bank is 4×72 bits and each bank is utilized to store only one TLP. It would be understood that in situations where TLPs with payload larger than one storage bank is received, multiple storage banks are utilized, however, one storage bank would never store mare than one TLP. The TLPs stored in the storage bank of the IB module 204 may contain the header data of the TLP, payload of the TLP, End-Of-Packet (EOP) identifier, and a pointer (nxt_ptr) to the next storage bank. To identify the end of a TLP, the IB manager 302 may set an EOP identifier at the last valid entry stored in the storage bank. All the other stored entries of the TLP would therefore include a non-EOP identifier.

In one implementation, the IB module 204 enables out-of-order read. The TLPs arriving at the IB module 204 in a particular order may be required to be read and transmitted in a different order. For this purpose, the IB module 204 implements the nxt_ptr. The nxt_ptr points to the storage bank where a next TLP is stored in the memory 308. This implementation may allow a linked list mechanism to be utilized in memory 308 which would enable its efficient usage.

In said implementation, the memory allocation status register 304 and memory deallocation status register 306 keep track of the allocation status of a particular storage bank. Each of the storage banks includes a corresponding bit in each of these registers. The IB manager 302 sets the memory allocation status register bit in the memory allocation status register 304 when a received TLP is stored in the storage bank of the memory 308. When a bank is completely read out from memory 308, the IB manager 302 sets the corresponding memory deallocation status register bit in the memory deallocation status register 306. When complete TLP is read out, allocation status bits are cleared that correspond to the set deallocation status bits.

As mentioned earlier, the DLL modules of each upstream and downstream port may be implemented at reduced clock rates. However, the other components such as the header processing unit 206 (as shown in FIG. 2) and the MRIOV core switching module 112 (as shown in FIG. 1) may be implemented at a fixed clock rate. The IB module 204 connected to the DLL module 114 and the MRIOV core switching module 112, and therefore is required to synchronize the data with respect to two different clock rates. To this end, the IB module 204 implements a dual port memory bank 308 which may allow read and write at asynchronous clock rates.

Figure 4:
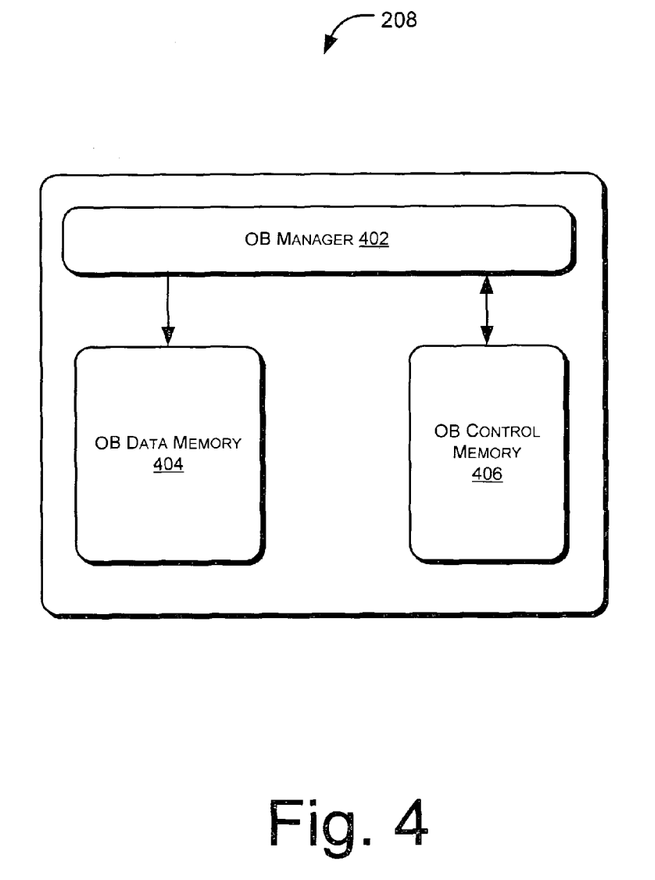
FIG. 4 illustrates an exemplary Output Buffer (OB) module, in accordance with an embodiment of the present subject matter.

FIG. 4 illustrates an exemplary OB module 208, in accordance with an embodiment of the present subject matter. In said embodiment, the OB module 208 includes an Output Buffer (OB) manager 402 connected to an OB data memory 404 and an OB control memory 406. The OB data memory 404 stores the data packets received from the other ports via the MRIOV core switching module 112. The OB module 208 may send the data packets to the respective DLL module in the same order in which they were received. Therefore, the OB data memory 404 and the OB control memory 406 may be implemented to work on First in First out (FIFO) scheme. Each TLP stored in the OB data memory 404 may have an associated entry in the OB control memory 406. The OB control memory 406 may store the control information of each TLP which may enable efficient usage of OB data memory 404. Further, the push and pop operations done on the OB data memory 404 and OB control memory 406 are controlled by the OB manager 402.

In one implementation, the OB control memory 406 may have a storage size of 32×20 bits where as the OB data memory 404 has 256×64 bit storage. For each TLP stored in the OB data memory 404, the OB control memory 406 implements a TLP start pointer, TLP end pointer and 'Dword' presence status indicators for first and last Dwords. It would be appreciated that the depth of the OB control memory 406, as well as of the OB data memory 404 can be increased if higher number of outstanding TLP transfers are required.

Further, since the MRIOV core switching module 112 and a DLL module connected to an OB module 208 may implement different clock rates, the OB data memory 404 allows write and read at different clock frequencies. Similarly, the OB manager 402, to be able to communicate with both the DLL module and the MRIOV core switching module 112 would implement logics working at switch core clock rate and DLL clock rate.

In one implementation, the OB module 208 enables the TLP replay function. In situations when an acknowledged (ACK) packet for a transmitted data packet is not received, or a Not acknowledged (NAK) is received, the data packet needs to be resent. This functionality of TLP replay is implemented by the OB module 208 by utilizing a dual read pointer FIFO for the OB data memory 404 and the OB control memory 406. The dual read pointer FIFO includes two read pointers and one write pointer. Among the two different read pointers, one read pointer may act as a real read pointer and the other may act as a dummy read pointer. When a data packet is read out and forwarded, the read is performed by the dummy read pointer. Further, upon receiving the ACK for the already read packets, the read is done by the real read pointer. Here it would be understood that multiple ACKs may be received by the OB module 208 and therefore, the real read may perform flushing of multiple entries out of the FIFO in a single clock cycle.

Since the OB module 208 interfaces the MRIOV core switching module 112 and the DLL module 114, the read and write pointer of the OB data memory 404 and the OB control memory may function at different clock rates. However, read pointers, the real and the dummy pointer of the FIFO will function at the same clock rate. Therefore, the dual read pointer FIFO scheme is used to implement re-transmitting of TLPs sequentially from asynchronous MRIOV core switching module 112 clock rate to DLL clock rate.

Figure 5:
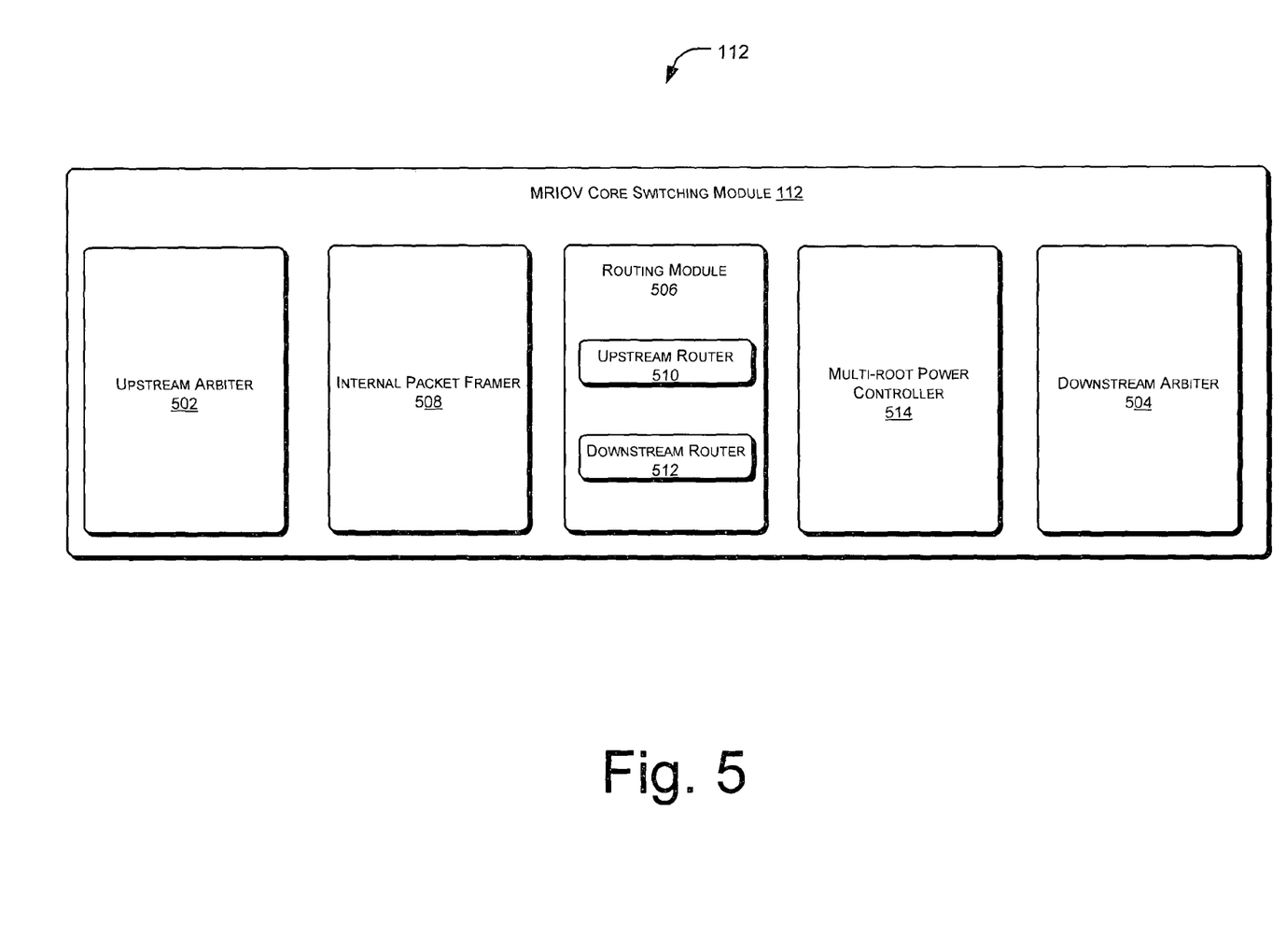
FIG. 5 illustrates an exemplary MRIOV core switching module, in accordance with an embodiment of the present subject matter.

FIG. 5 illustrates an exemplary MRIOV core switching module 112, in accordance with an embodiment of the present subject matter. In said embodiment, the MRIOV core switching module 112 includes an upstream arbiter 502 and a downstream arbiter 504. As explained in FIG. 2, for a TLP received by the IB module 204, header data is processed by the header processing unit 206. Upon determination of the destination of the TLP from its header data, the header processing unit 206 forwards the HC to the MRIOV core switching module 112.

In one implementation, the upstream arbiter 502 is configured to process the HC of the TLPs stored in the IB module of each downstream port 110. Therefore, the upstream arbiter 502 arbitrates between the TLPs that are stored in IB modules of downstream ports 110, and are to be forwarded to one of the upstream ports 108. Similarly, the downstream arbiter 504 is configured to arbitrate TLPs that are stored in the IB modules of upstream ports 108, and are to be forwarded to one of the downstream ports 110. Since both the upstream arbiter 502 and the downstream arbiter 504 function in a similar manner, the arbitration logic is explained with reference to the upstream arbiter 502, only and it would be understood that a similar logic can be implemented in downstream arbiter 504 to arbitrate between TLPs.

The upstream arbiter 502 may perform the arbitration based on an enqueue check on the HC of the TLPs. The upstream arbiter 502 performs the enqueue check by checking flow credits of destination upstream port 108, determining the OB module 208 memory status, and confirming port availability in the routing module 506. To successfully transmit a TLP to its destination, the flow credits of the upstream port 108 should be sufficient to receive the TLP. Further, the memory status of the outgoing buffer (OB) module 208 is determined to confirm if the OB module can accept complete TLP: And subsequently, the port status of the routing module 506 is confirmed before forwarding the HC of the TLP to the routing module 506 for delivery to the determined destination.

For example, if two TLPs, say TLP1 and TLP2 are received by two different downstream ports 110, say downstream port 110-1 and downstream port 110-2, and are identified to be sent to the upstream port 108-1. In such a scenario, the upstream arbiter 502 would receive the HCs for both the TLPs from corresponding header processing units. The upstream arbiter 502 may then perform the enqueue check on both the HC of the TLPs to arbitrate between the two data packets. During the enqueue check, if the upstream arbiter 502 determines that the flow credit of the upstream port 108-1 is not sufficient to support the TLP2, it may forward TLP1 to the routing module 106.

In one implementation, the MRIOV core switching module 112 includes the routing module 506 for the purpose of routing data packets from one IB module to another OB module. In said implementation, the routing module 506 includes an upstream router 510 for routing data packets from the IB modules of the upstream ports to the OB modules of the downstream ports. Similarly, the routing module 506 also includes a downstream router 512 configured to route data packets from the IB modules of the downstream ports to the OB modules of the upstream ports.

In operation, the routing module 506 receives the HC of the TLPs to be routed from the upstream arbiter 502 and the downstream arbiter 504. Based on the arbitration logic the arbiters determine the data packets which need to be routed and subsequently forward the HC of the data packet to the routing module 506. For example, for a TLP received at the downstream port 110-1, the upstream arbiter may forward the HC of the TLP to the downstream router 512 Based on the information in the HC, the upstream router 510 reads the TLP packet from the IB module 204 (not shown).

For this purpose, the upstream router 510 fetches the control information from the IB module 204, parses the information and fetches the TLP data from the memory bank 308. Based on the processed header information of the TLP, the data packet is routed to its destination. However, if the processed header information indicates an erroneous TLP, the routing module 506 may discard the TLP data from ingress buffer.

In another implementation, the routing module 506 is also configured to convert a type0 configuration request to a type1 configuration request based on the information present in the HC. It would be appreciated by those skilled in the art that the router can be implemented across multiple upstream and downstream ports and may not be limited to any particular number of ports. Further, the upstream router 510 and the downstream router 512 are configured to read multiple TLPs from different IB modules which may enable efficient and fast routing of data packets.

The MRIOV core switching module 112 also includes an internal packet framer 508. The internal packet framer 508 is configured to generate data packets. The generated data packets may include completion packets, error messages, power management messages, interrupt messages, vendor defined messages, and MSI interrupt messages based on type of received signal from different entities. As mentioned earlier, a TLP may be identified to be erroneous based on the processing of the TLP's header data by the header processing unit 206. In such a scenario, the generated signal is received by the internal packet framer 508 and an error message is generated. Similarly, the internal packet framer 508 may generate completion requests based on signals received from internal configuration registers (not shown). In such a scenario, the internal packet framer 508 may generate different completion packets such as a successful completion data packet with data, or a completer abort data packet.

It would be understood that internal packet framer 508 may generate multiple data packets based on received requests. Therefore, in one implementation, the internal packet framer 508 may include an arbiter to arbitrate between multiple generated packets and determine the order in which the packets can be sent. Further, in one implementation, the interrupt packets may be given priority over completion packets, which in turn may be given priority over vendor defined messages. In said implementation, the power management messages may be given the least priority during arbitration.

In one embodiment, the MRIOV core switching module 112 further includes a multi-root power controller 514. The multi-root power controller 514 is configured to aggregate the power status of downstream ports 110 in each active virtual hierarchy and enables the implementation of virtual power control in a multi-root switch. Similarly, the multi-root power controller broadcasts the power states of the upstream ports 108 to the respective downstream ports 110 in the virtual hierarchy associated with the upstream port. A 'PME_TURN_OFF' message received at the upstream port 108 may be transmitted to all the downstream ports 110 of virtual switch to which the upstream port 108 is connected. The multi-root power controller 514 may then wait for the response message from each of the downstream port 110 in this virtual switch. In one implementation, the response message can be a 'PME_To_ACK' message. Further, upon receiving such response messages from all the downstream ports 110 in this virtual switch, the multi-root controller 514 may send a 'PME_To_ACK' message to the corresponding upstream port 108.

The multi-root power controller 514 may also optimize the power consumed by the MRIOV aware switch 102. In one implementation, the multi-root power controller 514 is further configured to adjust the clock rate of the MRIOV core switching module 112. The multi-root power controller 514 may dynamically downscale the clock rate of the entire MRIOV care switching module 112 along with the header processing units, the OB modules and the power control modules present in the upstream and downstream ports. In one implementation, the multi-root power controller 514 may adjust the clock rate based on state of coupled ports, such as the number of active ports and link widths of the active ports to utilize minimum power and support maximum bandwidth.

In another implementation, the multi-root power controller 514 is also configured to power down the unused ports of the optimized MRIOV aware switch. For this purpose, the multi-root power controller 514 may assign power domains to different components of the MRIOV aware switch 102. In said implementation, upon identifying an unused port, the multi-root power controller 514 would transition the power domain of that particular port to power down state.

Although implementations of an optimized multi-root input output virtualization aware switch has been described in language specific to structural features, it is to be understood that the invention is not necessarily limited to the specific features described. Rather, the specific features are disclosed as exemplary implementations for the optimized multi-root input output virtualization aware switch.

We claim:

1. An optimized multi-root input-output virtualization (MRIOV) aware switch comprising:
    a plurality of upstream ports and a plurality of downstream ports, each of the plurality of upstream ports and each of the plurality of downstream ports comprising:
        a media access controller (MAC) configured to negotiate a link width and a link speed for exchange of data packets between a plurality of root complexes and a plurality of I/O devices;
        a clocking module configured to dynamically configure a clock rate of processing data packets based on one or more of the negotiated link width and the negotiated link speed;
        a data link layer (DLL) module coupled to the MAC, configured to operate at the clock rate, wherein the clock rate is indicative of a processing speed;
        an input buffer (IB) module, wherein the IB module is configured to,
            receive data packets from the MAC to be exchanged among the plurality of root complexes and the plurality of I/O devices;
            provide header associated with each of the data packets for identification of destination details associated with the data packets; and
            allow storing of transaction layer packets (TLPs) at different memory locations with linked list based addressing and out-of-order reads of the data packets; and
    a MRIOV core switching module coupled to the plurality of upstream ports and the plurality of downstream ports, wherein the MRIOV core switching module comprises an upstream arbiter configured to perform arbitration for the data packets exchanged between the plurality of root complexes and the plurality of I/O devices in a multi-host computing system, based on a header code (HC) of the header associated with each of the data packets.

2. The optimized MRIOV aware switch as claimed in claim 1, wherein the DLL is further configured to support virtual hot reset DLL packets and multi-root flow control update DLL packets.

3. The optimized MRIOV aware switch as claimed in claim 1, wherein the DLL is further configured to perform cyclic redundancy check (CRC) of the data packets at the configured clock rate, to ensure data integrity of the data packets, wherein the data packets are TLPs.

4. The optimized MRIOV aware switch as claimed in claim 1, wherein the DLL is further configured to send ACKnowledged (ACK) and Not AcKowledged (NAK) messages for confirmation of received data packets and automatic retransmissions of failed data packets, respectively.

5. The optimized MRIOV aware switch as claimed in claim 1, wherein each of the plurality of upstream ports and each of the plurality of the downstream ports further comprise an Output Buffer (OB) module configured to read and write data packets at asynchronous clock rates.

6. The optimized MRIOV aware switch as claimed in claim 1, wherein the Input Buffer (IB) module is implemented with dual port, bank based storage buffer.

7. The optimized MRIOV aware switch as claimed in claim 1, wherein each of the plurality of upstream ports (108) and each of the plurality of downstream ports (110) further comprise the Output Buffer (OB) module configured to:
receive data packets from the MRIOV core switching module to be exchanged among the plurality of root complexes and the plurality of I/O devices;
allow storing of the TLPs in a dual read pointer FIFO based memory; and
provide the data packets to the DLL module (114) to be forwarded to a destination through the MAC (118).

8. The optimized MRIOV aware switch as claimed in claim 1, wherein each of the plurality of upstream ports and each of the plurality of downstream ports further comprise a header processing unit configured to:
receive the header associated with each of the data packets, wherein the header of each of the data packets includes destination details indicative of a destination of each of the data packets;
identify an internal destination port associated with the destination of each of the data packets, wherein the internal destination port represents an associated virtual switch (VS) of a corresponding virtual hierarchy (VH) in the multi-host computing system; and
provide the HC to the MRIOV core switching module for each of the data packets with identified internal destination port based on the received header.

9. The optimized MRIOV aware switch as claimed in claim 8, wherein the identification of the internal destination port is based on parallel decoding of received header against each internal configuration space of the VS.

10. The optimized MRIOV aware switch as claimed in claim 8, wherein the header processing unit is further configured to generate a signal upon identifying an erroneous received header, wherein the providing is based on the signal.

11. The optimized MRIOV aware switch as claimed in claim 10, wherein the header processing unit is further configured to provide the signal to the MRIOV core switching module for generation of an error message.

12. The optimized MRIOV aware switch as claimed in claim 8, wherein the header processing unit is further configured to determine a routing mechanism for each of the data packets based on packet type, wherein the routing mechanism comprises one of address based routing, ID based routing, and implicit routing.

13. The optimized MRIOV aware switch as claimed in claim 8, wherein the header processing unit is further configured to analyze the header of each of the data packets, based on one or more packet type decoding, address field extraction, memory and 10 spaces check, and detection of errors.

14. The optimized MRIOV aware switch as claimed in claim 1, wherein each of the plurality of upstream ports and each of the plurality of the downstream ports further comprise a flow control module coupled to the DLL module and the IB module, configured to exchange credit flow information between the DLL module and the IB module.

15. The optimized MRIOV aware switch as claimed in claim 1, wherein each of the plurality of downstream ports and each of the plurality of upstream ports further comprise a power control module configured to configure a power state one of a native downstream port and a native upstream port respectively, to one of an LØstate, an L1 state, an L2, and an L3 state.

16. The optimized MRIOV aware switch as claimed in claim 15, wherein the power control module is configured to configure the power state of the native downstream port to LØs state based on identification of idle state of the native downstream port.

17. The optimized MRIOV aware switch as claimed in claim 15, wherein the power control module is configured to configure the power state of the native upstream port to the L1 state, the L2 state, and the L3 state, based on a received DLL data packet.

18. The optimized MRIOV aware switch as claimed in claim 1, wherein the arbitration is further based on one or more flow credits of a destination port, memory status of an output buffer (OB) module, and availability of a port in a routing module of the MRIOV core switching module.

19. The optimized MRIOV aware switch as claimed in claim 1, wherein the MRIOV core switching module comprises a routing module configured to route the data packets between an upstream port from among the plurality of upstream ports and, a downstream port from amongst the plurality of downstream ports, based on the HC received from one of the upstream arbiter and a downstream arbiter.

20. The optimized MRIOV aware switch as claimed in claim 1, wherein the MRIOV core switching module comprises an internal packet framer configured to generate data packets comprising one or more completion packets, error messages, power management messages, interrupt messages, vendor defined messages, and MSI interrupt messages, based on type of received signals.

21. The optimized MRIOV aware switch as claimed in claim 1, wherein the MRIOV core switching module comprises a multi-root power controller configured to aggregate power status of the plurality of downstream ports in each active virtual hierarchy of the multi-host computing system and enable virtual power control in the optimized MRIOV aware switch.

22. The optimized MRIOV aware switch as claimed in claim 1, wherein the MRIOV core switching module comprises the multi-root power controller, configured to optimize power utilized by the optimized MRIOV aware switch by dynamically adjusting clock rate of the MRIOV core switching module based on the state of coupled ports.

* * * * *